United States Patent [19]

Christiansen

[11] 4,294,660

[45] Oct. 13, 1981

[54] SPACER ASSEMBLY RETAINER ARRANGEMENT

[75] Inventor: David W. Christiansen, Lynchburg, Va.

[73] Assignee: The Babcock & Wilcox Company, New Orleans, La.

[21] Appl. No.: 840,207

[22] Filed: Oct. 7, 1977

[51] Int. Cl.³ .............................................. G21C 3/30
[52] U.S. Cl. .................................................... 376/442
[58] Field of Search ............................. 176/76, 78, 81

[56] References Cited

U.S. PATENT DOCUMENTS

| | | | |
|---|---|---|---|
| 3,665,586 | 5/1972 | Jabsen | 176/78 |
| 3,791,466 | 2/1974 | Patterson | 176/76 |
| 3,920,516 | 11/1975 | Kmonk | 176/78 |
| 3,982,994 | 9/1976 | Jabsen | 176/78 |
| 3,984,284 | 10/1976 | Long | 176/78 |
| 4,081,324 | 3/1978 | Flora | 176/78 |

Primary Examiner—Donald P. Walsh
Attorney, Agent, or Firm—Robert J. Edwards; Robert H. Kelly

[57] ABSTRACT

A nuclear reactor fuel assembly is designed to maintain its structural integrity during all phases of reactor operation. Spacer assemblies, containing a plurality of rectangular slotted plates intersecting and interlocking in egg-crate fashion, laterally maintain the fuel elements and guide tubes in a spaced array. Spacer assembly movement is restrained by collars mechanically fixed to guide tube sleeves at each spacer assembly location.

4 Claims, 9 Drawing Figures

SPACER ASSEMBLY RETAINER ARRANGEMENT

BACKGROUND OF THE INVENTION

1. Field of the Invention

This invention relates to fuel element spacer assemblies for nuclear reactors and, more particularly, to an apparatus for limiting spacer assembly movement.

2. Summary of the Prior Art

In water cooled heterogenous nuclear reactors, the reactor core in which the fission chain is sustained generally contains a multiplicity of fuel assemblies that are identical in mechanical construction and mechanically interchangeable in any core fuel assembly location. Each fuel assembly is designed to maintain its structural integrity during reactor heatup, cooldown, shutdown and power operation including the most adverse set of operating conditions expected throughout its lifetime. Design considerations for reactor operation typically include the combined effects of flow induced vibration, temperature gradients, and seismic disturbances under both steady state and transient conditions.

Each fuel assembly typically contains a plurality of thin elongated fuel elements, a number of spacer grid assemblies, guide tubes, an instrumentation tube, and end fittings.

The fuel elements often used in current applications are known as fuel rods and comprise cylindrical $UO_2$ fuel pellets, stacked end to end within thin walled tubes, having spring loaded plenums at each end of the tube, and sealed with end caps or plugs. The fuel rod cladding is made from a material, such as a zirconium alloy, which has good neutron economy, i.e., a low capture cross section. Each fuel rod is capable of transferring fission generated heat to a circulating coolant while containing the fission products and the fuel material. The fuel rods must withstand the effects of thermal cycling, fission gas release to the rod plenum, fuel densification, cracking and ratcheting of the fuel pellets, pellet-clad mechanical interactions, and corrosion or radiation induced changes in the mechanical properties of the cladding.

Depending upon the position of a fuel assembly within the core, a number of elongated cylindrical guide tubes, arranged in parallel with fuel rods, are used variously to provide continuous sheath guidance for control rods, axial power shaping rods, burnable poison rods, or orifice rods. The guide tubes, which usually have a larger diameter than the fuel rods are provided with sufficient internal clearance to permit coolant flow therethrough to limit the operating temperatures of the absorber materials which may be inserted therein, and to permit rod insertion and withdrawal motions within the guide tubes as required during all phases of reactor operation.

The fuel rods and guide tubes are supported in a square array at intervals along their lengths by spacer assemblies that maintain the lateral spacing between these components. The spacer assemblies are generally composed of a multiplicity of slotted rectangular grid plates arranged to intersect and interlock in an eggcrate fashion to form cells through which the fuel rods and guide tubes extend. Illustratively, the grid plates may be of the type such as described in U.S. Pat. No. 3,665,586 by F. S. Jabsen and assigned to The Babcock & Wilcox Company which have indentations that laterally extend essentially perpendicular to the longitudinal axes of the fuel rods into those cells which have fuel rods for engagement and support of the fuel rods.

The spacer assemblies maintain a necessarily precise spacing between fuel rods in order to avoid neutron flux peaks and regions of abnormally high temperature (hot spots) where burnout, i.e., severe local damage to the fuel rods, could occur. The spacer assemblies assure the mechanical stability that is essential to preclude the distortions which may be otherwise caused by flow induced vibrations, pressure differences, and thermal stress. However, the number of spacer assemblies used to provide for fuel element support within the core must be balanced with the countervailing need to minimize this structural material which contributes to the parasitic absorption of neutrons. Coolant circulating through the spacing between the fuel rods must be sufficient to remove the fission generated heat. The spacing between fuel rods is quite restricted, for example, on the order of 0.15 inches. Thus, incipient deviations from design spacing dimensions, cladding eccentricities, surface roughness and warping markedly affect distribution of the coolant flow about the fuel rods and may lead to localized flow restrictions in the coolant channels, causing a rise in fuel rod surface temperature at the points of restrictions. Hence, it is extremely important that the spacer assemblies remain fixed throughout a fuel assembly's life.

A number of means have been employed in the prior art to limit spacer assembly movement. In the past, for example, the guide tube wall diameter has been swaged out to engage the surfaces of surrounding sleeves attached adjacent each end of the grid plates of a spacer assembly. This has the effect, however, of distorting the guide tubes and spacer grids due to the material drawing mechanism of the swaging operation, thereby inducing (1) variations in the parallelism of the spacer assemblies and (2) fuel element bow. Attempts to restrain spacer assembly movement by welding the guide tubes directly to the grid plates also have made the maintenance of parallelism difficult.

An arrangement for restraining and retaining the spacer assemblies in place without tending to induce variations in the relative parallelism of several spacer assemblies within a fuel assembly and without causing fuel rod bow is highly desirable.

SUMMARY OF THE INVENTION

In accordance with the principles of the invention, an arrangement is presented which restrains movement of the spacer assemblies within a fuel assembly. The spacer assemblies are composed of a grid of slotted rectangular plates arranged to intersect and interlock in an eggcrate fashion with their lengthwise edges perpendicular to the axes of the fuel elements and guide tubes.

Each guide tube is provided with a number of longitudinally spaced sleeves attached thereto by welding, or the like, which circumscribe the guide tubes within and adjacent to the cellular openings in the spacer assembly that accommodate the guide tubes. Collars, having machined slots designed to mechanically interlock each collar with each respective spacer assembly cell that receives a guide tube, are provided and fixed with each of such cells. The sleeves contain apertures on the portions thereof extending beyond the grid plates. Thus, upon assembly, the grid plate collars generally circumscribe the sleeve portions of the guide tubes.

The guide tubes are permanently fixed to the spacer assemblies in order to restrain spacer assembly motion by crimping portions of the collars that are adjacent to the apertures of the sleeves, into the apertures. Hence, the guide tubes are firmly fixed to the spacer assemblies without welding or brazing, and without otherwise distorting the guide tubes.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
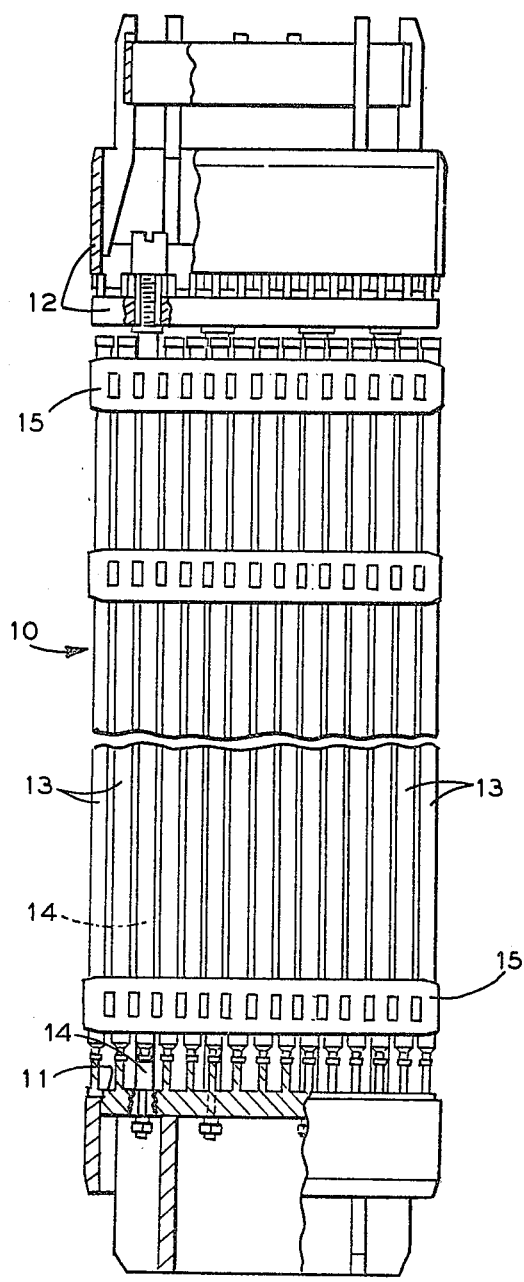
FIG. 1 is an elevation view, partly broken away and partly in section, of a fuel assembly.

Referring now to the drawings, there is shown in FIG. 1, oriented with its longitudinal axis in the vertical plane, a nuclear fuel element assembly 10 including a lower end fitting 11, an upper end fitting 12, a plurality of elongated cylindrical fuel elements 13, hollow cylindrical guide tubes 14 and spacer grid assemblies 15. The fuel elements 13 and guide tubes 14 are laterally spaced and supported in a square parallel array by the spacer grid assemblies 15. The extremities of the guide tubes 14 are mechanically fixed to the lower and upper end fittings.

Figure 2:
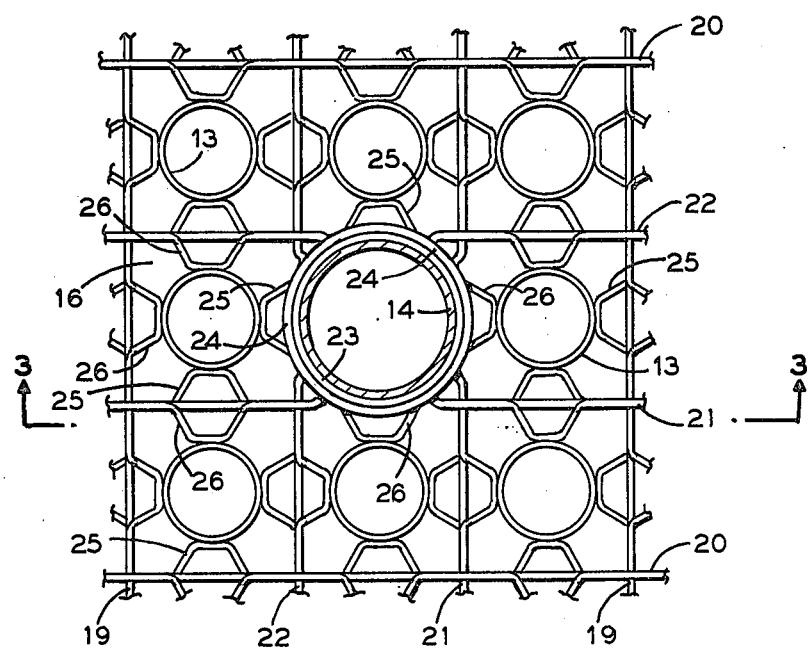
FIG. 2 is an enlarged plan view of a portion of the fuel assembly of FIG. 1 made in accordance with an embodiment of the invention.
Figure 3:
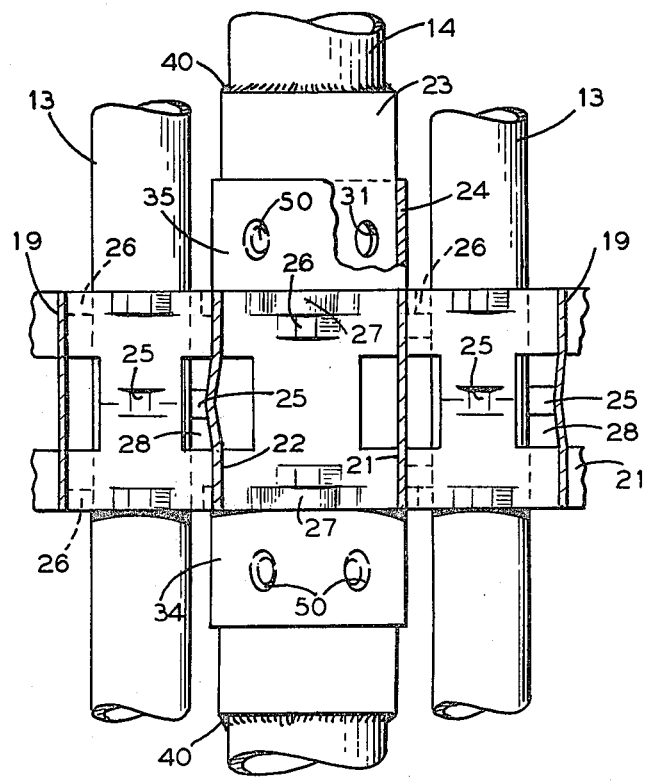
FIG. 3 is a side sectional view of the arrangement of FIG. 2 taken along the line 3—3.

FIGS. 2 and 3 more clearly illustrate a portion of the fuel assembly 10, the fuel elements 13 and a guide tube 14, and include grid plates 19, 20, 21, 22, a guide tube sleeve 23, and a grid collar 24, arranged in accordance with a preferred embodiment of the invention.

The grid plates 19, 20, 21, 22 are slotted rectangular members, generally of the type described in U.S. Pat. No. 3,665,586, which is incorporated herein by reference, issued to F. S. Jabsen and assigned to The Babcock & Wilcox Company. As is shown in FIGS. 2 and 3, the plates are formed with indentations 25 and 26, respectively characterized as resilient and rigid, which are projections of the plate faces spaced at intervals through their length and breadth. In the cases of grid plates 21 and 22, moreover, arcuate saddle-shaped surfaces 27 (see FIG. 9) are also formed adjacent the lengthwise edges of the plates at alternately spaced intervals. Opening 28 serve as access openings for tools, not part of the invention herein, used to assemble and disassemble the fuel element assemblies and to effect the relative resiliency of the resilient indentations which are located on the plate panels between the openings.

Figure 4:
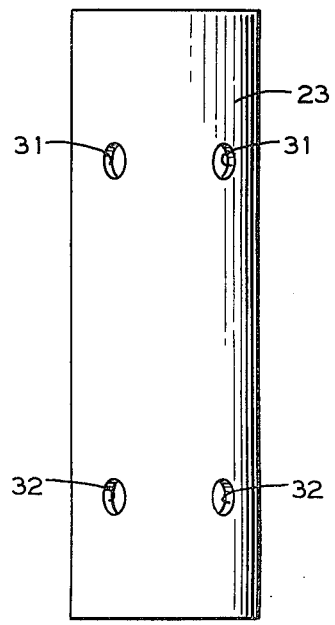
FIG. 4 is an elevation view of a sleeve for a guide tube made in accordance with the principles of the invention.

The guide tube sleeve 23, as shown in FIG. 4, is a hollow cylinder containing a plurality of circumferentially spaced apertures 31 longitudinally spaced from a second plurality of circumferentially spaced apertures 32.

Figure 8:
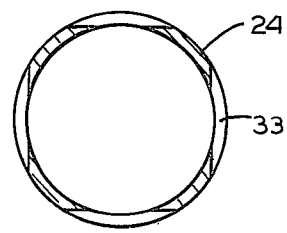
FIG. 8 is a view taken along line 8—8 of FIG. 5.
Figure 5:
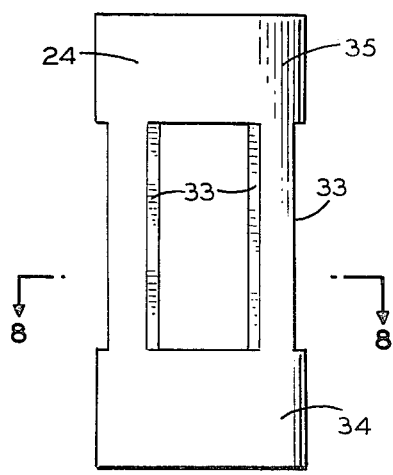
FIG. 5 is an elevation view of a spacer assembly collar made in accordance with the principles of the invention.

FIGS. 5 and 8 illustrate a cylindrical grid collar 24 which, in the preferred embodiment illustrated, is provided with four centrally located longitudinal slots 33, circumferentially spaced at ninety degree intervals between end portions 34, 35.

Figure 9:
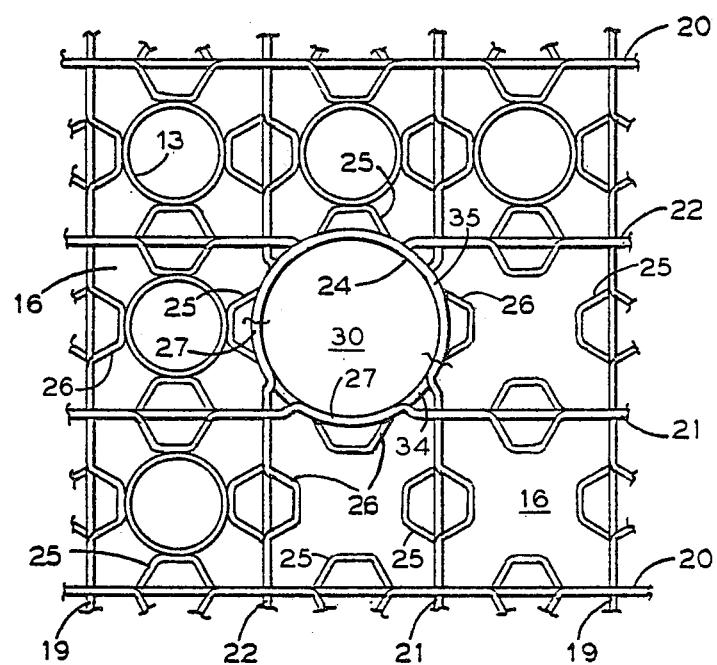
FIG. 9 is an alternate view of FIG. 2 with a number of fuel elements, the guide tube and guide tube sleeve omitted for clarity.

As is best shown in FIG. 9, the grid plates 19, 20, 21, 22 are arranged to mutually intersect and interfit in an egg-crate fashion to form a plurality of fuel element cells 16, each having four sides bordered by a portion of the grid plates including a resilient indentation 25 or rigid indentations 26 which projects into the cells 16, and a guide tube cell 30. The guide tube cell 30 has four sides bordered by the portions of the grid plates 21, 22 that include the arcuate saddle-shaped surfaces 27. In each fuel element cell 16, a resilient indentation 25 projects into the cell in directional opposition to rigid indentations 26 projecting into the same cell from the opposite side or border of the cell 16.

A grid collar 24 is mechanically interlocked within the spacer assembly 15 at each cell 30 by arranging the bordering grid plates 21, 22 to peripherally pass through the slots 33 (FIG. 5). In the preferred embodiment illustrated (see FIGS. 2 and 9), the diameter of grid collar 24 is such that the end portions 34, 35 longitudinally align with a part, that is the ridge between the peaks, of the arcuate saddle-shaped surfaces 27 of the grid plates 21, 22 passing through the slots 33. Hence, a spacer grid assembly 15 includes a plurality of mechanically interfitted and interlocked plates 19, 20, 21, 22 and collars 24.

As is shown in FIG. 2 and FIG. 9, each cell 16 accommodates a fuel element 13, and the cell 30 accommodates the guide tube 14. The indentations 25, 26 project the surface of the grid plates into the cells 16 to support the fuel elements. The arcuate saddle-shaped surfaces 27 of the portions of the plates 21, 22 bordering each cell 30 complements the cylindrical contour of the guide tubes 14 to facilitate positioning of the guide tubes with the cells 30. A resilient indentation is generally formed longitudinally aligned with two rigid indentations on the opposed faces of each grid plate 20, 21, 22, 23. At the spaced intervals where the saddles 27 are formed, however, a resilient or rigid indentations are formed only on the plate face opposite the saddle face, that is, opposite the guide tube cells.

Figure 6:
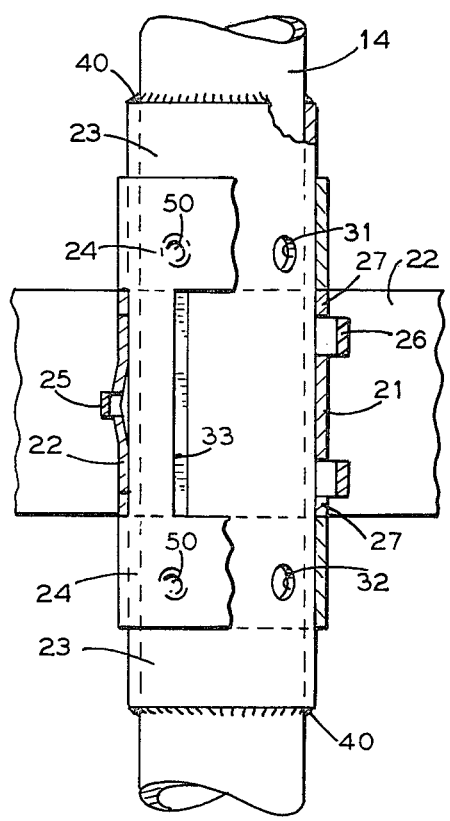
FIG. 6 is a view of the arrangement of FIG. 3 with additional parts removed for clarity.

Each guide tube sleeve 23 is coaxially fitted over and welded at 40 to the guide tubes 14, as is typically illustrated in FIG. 6, at longitudinally spaced intervals at the spacer grid assembly locations (not shown). The guide tube sleeves thus become an integral part of the guide tube. Each sleeve 23 will be approximately longitudinally centered within a spacer grid assembly 15 when the fuel element assembly 10 is assembled.

Figure 7:
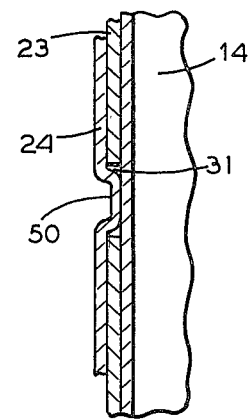
FIG. 7 is an enlarged detail view, in section, of a portion of the fuel assembly of FIG. 2.

For assembly, the portions of the guide tubes 14 bearing the guide tube sleeves 23 are (FIG. 3) approximately longitudinally centered within the spacer grid assemblies such that a portion of each sleeve 23 is circumscribed by a grid collar 24. As illustrated in FIG. 7, the collar 24 is then crimped at 50 into the radially adjacent apertures 31 or 32 (not shown) of the sleeve 23. In this manner, the guide tube 14 is mechanically fixed to the spacer grid assembly 15 without the need for direct welding or brazing or metallurgical bonds between the spacer grid assembly and guide tube. Thus, misalignment of the guide tubes and spacer grids due to material drawing, variations in parallelism between the longitudinally spaced spacer grid assemblies, and fuel element bow are avoided.

It will be evident to those skilled in the art that modifications may be made, for example, the direct attachment of collars to either end of the guide tube cells in lieu of interlocking a collar with the guide tube cell borders, or the use of different multiples, shapes or orientations of collar slots and sleeve apertures, or alternate collar to plate interlock mechanisms, without departing from the spirit or scope of the invention as recited in the claims.

I claim:

1. In combination with a nuclear fuel assembly of the type having a plurality of vertically extending fuel elements and guide tubes maintained in a laterally spaced array by at least one spacer assembly with a multiplicity of intersecting slotted grid plates that form first cells through which the fuel elements are inserted and second cells through which the guide tubes are inserted, an improved arrangement for restraining spacer assembly movement comprising: guide tube sleeves circumscribing and fixedly connected to the guide tubes, each guide tube sleeve positioned so as to completely circumscribe the guide tube within each guide tube cell and partly beyond each guide tube cell, said guide tube sleeve portion extending beyond said guide tube cell completely connected to the circumference of said guide tube by welding, each sleeve having at least one aperture in the portion thereof extending beyond the guide tube cell; a plurality of collars; said collars having at least one longitudinal slot therein for mechanically interlocking each collar with a portion of the grid plates defining a respective guide tube cell by passing a grid plate within said slot; each of the collars circumscribing completely part of a guide tube sleeve, and each of said collars being crimped in part to extend into at least one aperture of said sleeves.

2. An improved arrangement for restraining spacer assembly movement as recited in claim 1, in which each collar includes a crimped portion extending into said guide sleeve aperture whereby said crimped portion is a radially adjacent said aperture of a guide tube sleeve at circumferentially spaced intervals.

3. An improved arrangement for restraining spacer assembly movement as recited in claim 2, in which each guide tube sleeve includes a first plurality of circumferentially spaced apertures longitudinally spaced from a second portion of circumferentially spaced apertures.

4. An improved arrangement for restraining spacer assembly movement as recited in claim 3, in which each collar includes a plurality of the longitudinal slots circumferentially spaced at ninety degree intervals between end portions of the collar and a grid plate passing within each of the slots so that the collar is mechanically interlocked with the grid plates.

* * * * *